Feb. 16, 1960
W. E. PERKINS
2,924,867
PIPE LINING TROWELING APPARATUS
Filed Feb. 11, 1957
2 Sheets-Sheet 1
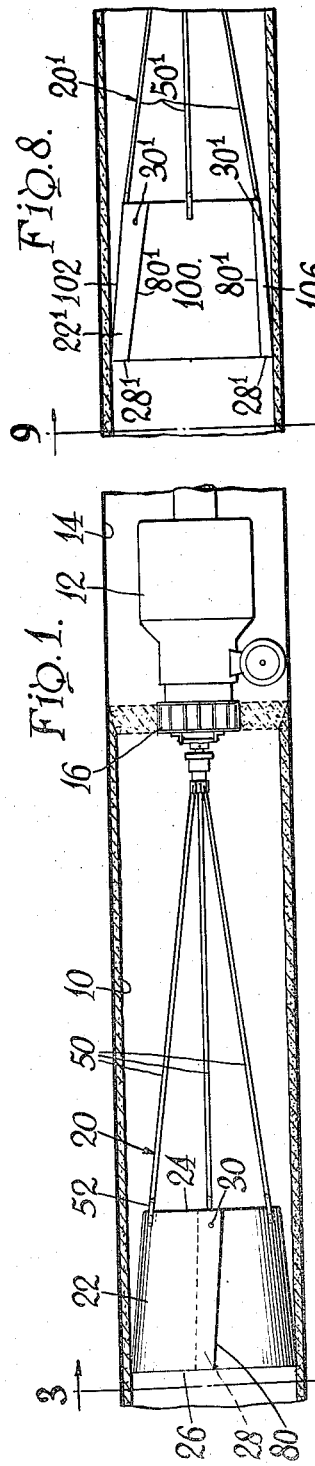
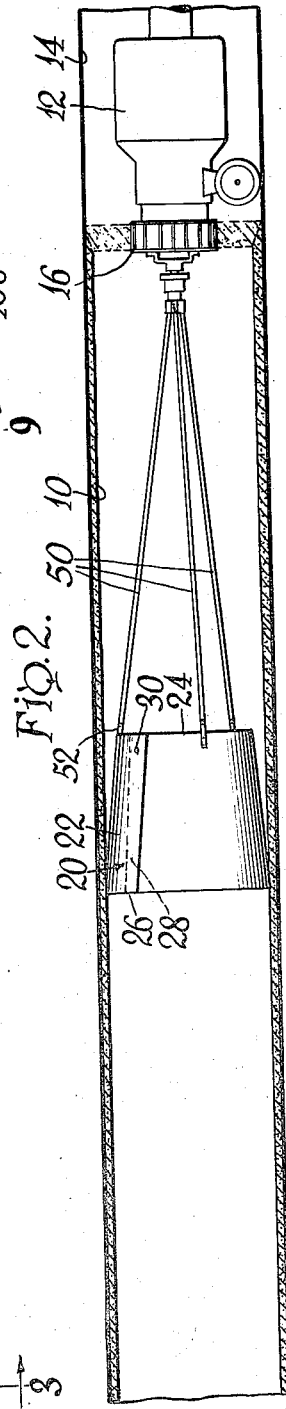
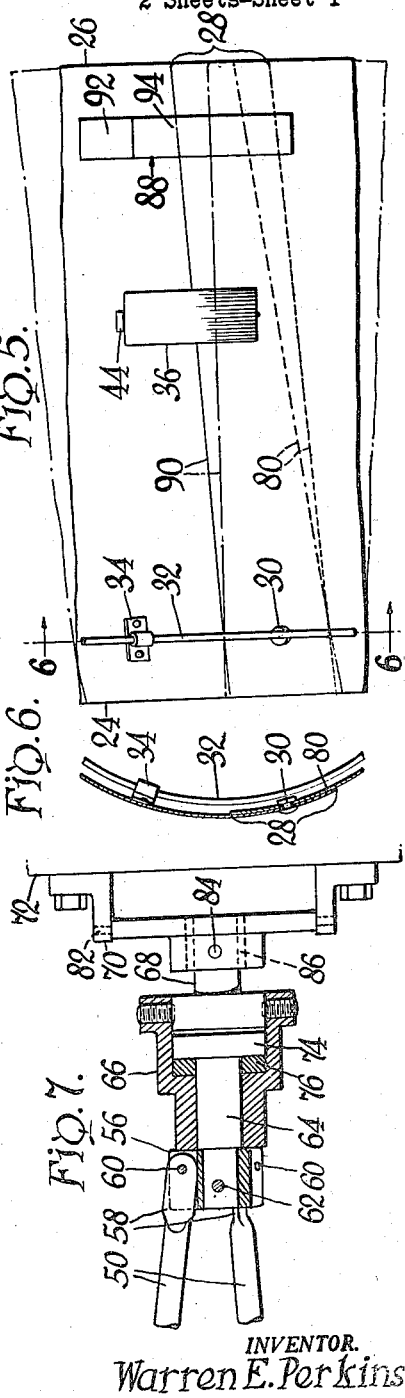
INVENTOR.
Warren E. Perkins,
BY
Bean, Brooks, Buckley & Bean
ATTORNEYS.

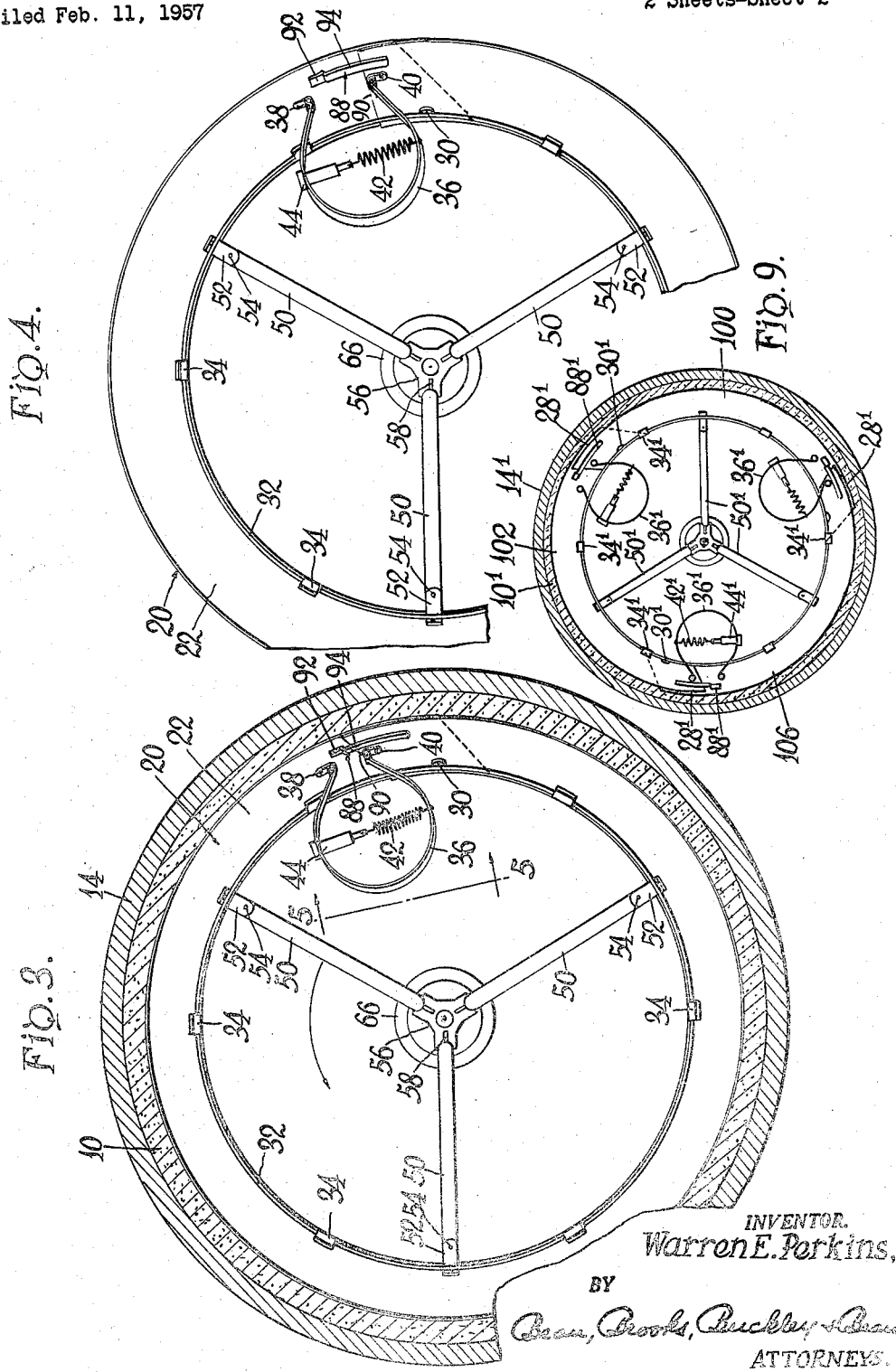

United States Patent Office 2,924,867
Patented Feb. 16, 1960

2,924,867

PIPE LINING TROWELING APPARATUS

Warren E. Perkins, Grand Island, N.Y., assignor to Perkins Pipe Linings, Inc., Grand Island, N.Y.

Application February 11, 1957, Serial No. 639,242

10 Claims. (Cl. 25—38)

This invention relates generally to apparatus for applying a protective coating of mortar of like material to the inner walls of pipe lines, conduits and the like, and more particularly to troweling facilities of such apparatus for performing the final smoothing operation to the lining immediately after the same has been applied to the wall of the pipe or the like.

The art of applying a lining of mortar or similar plastic material to the interior of pipe lines in place in the ground has undergone considerable development for many years, extensive use having been made of a class of machines which travel through the pipe being lined while distributing a coat of lining material thereto by means of centrifugal application of the lining material by a rotary distributor head. Apparatus of this general type is described in U.S. Patents No. 2,108,319 and 2,262,647 and more recently in U.S. Patents No. 2,704,873 and 2,758,352. Machines of this kind are intended to provide a lining which is quite smooth as it is applied by the rotary distributor head, but it will be appreciated that, since high flow coefficients of the finally lined pipes are of utmost importance, it is highly desirable and often of commercial necessity to further smooth the surface of the applied lining by means of a light troweling immediately after the application of the lining, while it is still in plastic condition.

Heretofore, the most widely used type of troweling apparatus has been of the high speed rotary kind, for example, as generally illustrated in U.S. Patents No. 2,262,-467 and 2,704,873. Rotary trowels of this type have certain undesirable features, especially as applied to apparatus for lining small diameter pipes, such as the need for a power supply of a particular rotary speed which in many cases adds to the bulk of the mechanism within the pipe, and the need for rather precise adjustment of the troweling mechanism so as not to produce spiral scoring of the lining, particularly where the lining material is of rather low viscosity.

Still another type of troweling apparatus proposed heretofore has been of the kind comprising a plurality of overlapping plate-like troweling members which are individually spring mounted to expand against the lining in a radial direction, as for example the trowel illustrated in U.S. Patents No. 2,517,780 and 2,261,928, difficulty having been experienced with the first type in that the trowel plates form a cylindrical troweling surface which tends to plow the lining at its end edges when negotiating a curve in the pipe line, and also the rigid trowel plates fail to lap smoothly when a slightly out-of-round part of the pipe being lined is encountered. In the second type of trowel of this group, no lapping is attempted at all and this results in ridges where the mortar or other coating material is of very low viscosity. Furthermore both of these kinds of trowels are subject to the objection that the individual radial springing of the trowel members is difficult to equalize and incapable of automatically balanced adjustment to out-of-roundness of the pipe being lined.

The foregoing and other difficulties were met by the continuously annular rubber or otherwise elastic trowel of Patent No. 2,758,352, but this trowel is subject to certain deficiencies in some kinds of uses, chiefly that rubber is not ideal for a troweling surface from the viewpoint of maximum smoothness in use, especially after wear, and that a rubber member of considerable size results in a trowel of considerable weight so that in many cases it is necessary to provide a weight bearing carriage as shown in that patent. Also, like the aforementioned cylindrical lapped-plate type trowel, a rubber trowel compresses to form a cylindrical, flat troweling surface, so as to have a tendency to roll the aggregate in a cement lining surface, resulting in a rough or ridged finish.

In accordance with the present invention, a pipe lining troweling apparatus is provided in which the troweling member is essentially of the non-rotary kind, although, in a preferred embodiment of the apparatus, means are provided to induce a slow rotary motion as the trowel actually travels through the pipe. The trowel is further characterized by the provision of a frustro-conical troweling surface composed of very thin, flexible spring sheet material so mounted as to conform to the shape of the surface of the lining material to be troweled so as to readily adapt itself to any non-circularity of the pipe being lined without undue pressure against any portion of the lining, and articulated in such manner as to readily conform to changes in circumferential dimensions of the interior of the lined pipe, the articulated structure being biased in a radially outward direction against the pipe lining by means of circumferentially oriented spring forces, as opposed to radially oriented ones of the prior art. Despite the articulated nature of the troweling surface, means are provided to prevent the leaving of substantial lap marks in the troweled lining surface, as well as to prevent fouling of the joints in the troweling surface by the lining material or other debris. Furthermore, the frustro-conical shape of the troweling surface, especially when combined with a preferred harness structure whereby the trowel is drawn in a freely trailing manner through the pipe being lined, confines the troweling contact to the rear edge portion of that surface, so that the trowel can negotiate bends in the pipe line in a facile manner, and also so that the troweling action is similar to that resulting from the edge contact of a properly used mason's trowel, with similarly smooth results.

Accordingly a major object of the invention is to provide an improved troweling apparatus for use in equipment for applying an interior lining to pipes or the like.

Another object of the invention is to provide an improved troweling apparatus as aforesaid which requires no elaborate rotary power supply and which provides a troweling motion which is essentially longitudinal of the pipe being lined.

Still another object of the invention is to provide an improved troweling apparatus as aforesaid which has a troweling surface which readily adapts itself to the shape and dimensions of the interior surface of the pipe lining material to be smoothed.

Still other objects of the invention are to provide an improved troweling apparatus as aforesaid in which the troweling pressure is applied with a high degree of uniformity about the area being troweled despite changes in shape or size, or both, of the surface of the pipe lining being troweled, and the troweling contact is confined essentially to a trailing edge, similarly to the action of a properly used mason's trowel.

Further objects of the invention are to provide an improved pipe lining troweling apparatus as aforesaid which will provide a smoothly troweled surface without significant lap marks therein, whether the pipe line being treated is straight, curved, or composed of misaligned sections, and is inherently self-clearing so as to eliminate any fouling of the troweling apparatus by debris such as might otherwise deform or weight the same.

A still further object of the invention is to provide an improved troweling apparatus as aforesaid which is characterized by lightweight so as to bear uniformly on the lining surface being troweled without the need of carriage or other support means.

Other objects of the invention will be apparent from the foregoing general introduction and from the following description and claims and from the drawings wherein:

Fig. 1 is a vertical sectional view of a pipe being lined by a pipe lining apparatus incorporating a trowel in accordance with one embodiment of the invention;

Fig. 2 is a view similar to Fig. 1, showing the apparatus after it has progressed a short distance through the pipe being lined;

Fig. 3 is a cross-sectional view taken about along line 3—3 of Fig. 1 on an enlarged scale, showing a trailing end view of the trowel of Fig. 1 in use;

Fig. 4 is a view similar to Fig. 3 but showing the trowel of Fig. 1 in an expanded condition such as it would normally assume without the embracing restraint applied by the pipe lining material when it is in use;

Fig. 5 is a fragmentary detail view taken about along line 5—5 of Fig. 3, and showing in phantom line the relationship of the same parts when they assume the position shown in Fig. 4;

Fig. 6 is a fragmentary sectional view taken about along line 6—6 of Fig. 5;

Fig. 7 is a detail view, partly in section, of the coupling of the trowel harness to the pipe lining machine of Fig. 1;

Fig. 8 is a fragmentary view similar to a portion of Fig. 1 but showing an alternate form of trowel element; and Fig. 9 is a cross-sectional view taken about along line 9—9 of Fig. 8, showing a trailing end view of the trowel of that figure.

Referring more particularly to Fig. 1, a preferred embodiment of the pipe lining troweling apparatus of the invention is shown in use in the troweling of a lining 10 just after the same has been applied by a pipe lining machine 12 to the interior wall of a pipe 14, which may be in place below ground (not shown). Only a fragment or trailing end portion of the pipe lining machine 12 is shown, since this pipe lining machine may be of any suitable or well known type, the kind shown being that of U.S. Patent No. 2,758,352. It will be understood that whatever kind of pipe lining machine 12 is utilized, that some method of propelling the machine 12 through the pipe will be provided, such as the self-propelling mechanism shown in the aforementioned patent, and in accordance with the preferred illustrated embodiment of the troweling apparatus of the present invention, utilization of the rotary motion available at the trailing end of many types of pipe lining machines is made, as for example the rotary motion of the lining material distributor head 16 of the illustrated machine 12, which rotary distributor head is a characteristic common to many types of pipe lining machines of this class. The use made of this rotary motion will be set forth in detail hereinbelow.

The pipe lining machine 12 is utilized to draw a trowel 20 of the present invention through the pipe 14 in troweling contact with the newly applied lining 10 therein while at the same time tending to impart a slow rotary motion to the trowel, as can be seen by comparison of the illustration of Fig. 1 with that of Fig. 2, wherein the apparatus is shown after progress a short distance through the pipe, as represented by the off-set relation of those figures, during which the trowel has rotated about one-eighth of a turn. The trowel 20 comprises a troweling surface body member consisting primarily of a shell 22 formed of very thin spring sheet material, for example, thin spring steel which is formed into frusto-conical shape. This conical shape is such that the leading edge 24 of the trowel body is of substantially smaller diameter than the bore of the lined pipe being troweled, while the trailing edge portion 26 of the shell 22 conforms to the shape and size of the pipe lining surface so as to bear lightly thereagainst for performing the smoothing operation thereon.

In order to provide the circumferential size variability necessary for enabling the trailing edge portion 26 to so conform to the lining surface, the shell 22 is articulated so that the base circumference of its frusto-conical form is variable. In the trowel of Fig. 1, this articulation is provided at a single lap 28 formed by the opposite end edges of a single, otherwise continuous strip of sheet material from which the shell 22 is made. The lapped portions of the shell 22 are interconnected at the leading edge or head end portion 24 of the trowel body so as to substantially fix the circumferential dimension of that head portion, and to establish its cross-sectional shape as generally circular which in turn establishes the desired circularly conical shape of the trowel body shell while permitting the trailing edge portion thereof to deviate quite freely therefrom as dictated by the cross-sectional shape of the lining against which it bears.

Thus, the lapped portions of the shell 22 forming the joint 28 are pivotally interconnected, as by a rivet 30 forming a pivot about which the joined ends of the shell material rotate to impart a scissors-like motion to the lapped joint 28, thereby providing the aforesaid variable dimension to the trailing edge portion 26. It will be understood that preferably the lap 28 is of sufficient width to continue to the rear or traweling edge 26 in any operative position of the shell 22. For maintaining the very thin and flexible sheet material of the shell 22 in the desired circular cross sectional shape at the leading edge 24 thereof, this portion of the trawel body is preferably stiffened, for example by provision of a circular liner which may be in the form of a ring 32 mounted within the shell 22 in a suitable manner, as by stand-off brackets 34 riveted or otherwise suitably fixed to the shell wall and located and dimensioned to mount the ring 32 in alignment over, preferably directly over, the axis of the pivot 30. As shown, the diameter of the ring 32 is preferably nearly that of the shell portion adjacent thereto, the ring crossing the head of the pivot forming rivet closely thereto. Thus the rigidizing ring 32 does not interfere with the flexing of the shell 22 at its trailing edge 26 or about the pivot axis of the rivet 30, and to further insure freedom of these movements, it is preferred that the stand-off mounts 34 journal the ring 32 with a somewhat loose fit, wihch together with slight flexure of the ring enables substantially complete freedom of the shape and size changing motions of the trailing edge 26.

Means are provided to bias the trailing edge portion 26 of the shell 22 toward an enlarged circumferential dimension so as to apply the desired light troweling pressure to the lining 10 being smoothed, and in accordance with an important feature of the invention this biasing force is applied in a circumferential direction so as to be substantially equal at all portions of the trailing or troweling portion 26 of the shell 22, these portions in effect filling the lined pipe to the shape and dimension dictated by the shape and dimension of the pipe lining itself. For this purpose, means are provided to urge the lapped portions of the shell 22 to rotate relatively about the pivot 30 in a lap-reducing, that is shell-opening, direction. In the illustrated embodiment of the invention, this means comprises a compression spring in the form of a loop shaped strap 36 hingedly anchored at its opposite ends by mount members 38, 40 spot welded or otherwise suitably fixed to the shell 22 in the region of the lapped joint 28 therein so as to urge the portions of the shell forming the joint apart in a direction circumferential of the shell. Preferably this bias means is adjustable for varying the troweling pressure, as by provision of a tension spring 42 interconnecting the opposite legs of the spring 36 to oppose the force thereof to a degree adjustable by a threaded telescoping mount 44 which connects one end of the spring 42 to the corresponding leg of the compression spring 36 in an axially adjustable manner.

It should be noted that the trowel body structure as thus far described is of very light weight construction so that the weight thereof does not contribute significantly to the troweling pressure at the lower edge as compared to the uniform troweling pressure applied by the adjustable bias means 36, 42. This light weight characteristic extends to the hub or harness portion of the trowel by which the trowel body is drawn through the pipe being lined, and for this purpose the harness portion of the trowel comprises a plurality of hollow tubular rods 50 having flattened opposite ends, which rods are articulatedly connected to the leading edge 24 of the trowel body, as by small clevis-blocks 52 riveted or otherwise suitably fixed to the leading edge 24 of the shell 22 and loosely pinned as at 54 to the flattened ends of the rods 50 in a manner to accommodate the slight changes in the size and disposition of this edge as the walls of the shell change in shape and angularity in use.

Preferably the rods 50 are disposed as shown to lie substantially in an extension of the conical plane of the shell 22 so as to exert substantially no deforming forces thereon. The leading ends of the rods are connected by a coupling which may be in the form of an annular hub formed with a spider 56 providing a number of clevises in which the flattened ends 58 of the rods 50 are loosely journaled, as by pins 60. The spider 56 is pinned as at 62 to a stub shaft 64 journaled in a bearing housing 66 having an axle part 68 mounted as by a bracket 70 to the rotary portion 72 of the distributor head 16 of the pipe lining machine, as shown. The stub shaft 64 has a flanged end 74 which bears against a thrust bearing 76 mounted within the housing 66 so that the forward motion of the pipe lining machine 12 is transmitted through the coupling described to the trowel harness rods 50 while the high speed rotary motion of the distributor head 16 is not so transmitted.

There will, nevertheless, be some friction at the thrust bearing 74, 76 so that some torque will be transmitted to the spider 56 and thence through the harness rods 50 to the trowel body. This torque is utilized to cause the trowel to "creep" in a motion such as to trace a spiral path of long pitch as it is pulled through the pipe being lined. To this end unnecessary imbalance in the trowel is avoided, and although the spring and pivot parts of the trowel of Figs. 1–7 are asymmetrically disposed with respect to the long axis of the trowel apparatus, tests have shown that this asymmetry is negligible with the proportions shown and does not affect the desired slow rotary motion when the device is in use. Of course counterweights could be employed for more perfect balance where found necessary, and it will be readily understood that it is a simple matter to design the thrust bearing 74, 76 for transmission of the desired amount of torque. It should be understood, however, that this torque is preferably insufficient to cause the trowel to rotate when stationary and will in no way cause scoring of the pipe lining surface; it is only sufficient to cause the trowel to rotate slowly as shown incidental to its forward motion through the pipe.

This rotary motion, although slight, performs the important service of aiding in the prevention of fouling of the trowel, since small lining material particles or like debris which fall on the upper surface of the shell 22 are cleared by falling therefrom as that portion of the surface rotates to form the lower surface of the trowel, this debris being thus disposed of before it reaches sizable proportions and therefore being easily troweled into the pipe lining surface as the trailing edge 26 of the trowel passes. Furthermore, the direction of rotary motion of the trowel is chosen so that the exposed lap edge 80 of the lapped joint 28 follows a retreating course with respect to any point in the lining 10 surface crossed thereby, as shown in Fig. 3 where the direction of rotation is indicated by the curved arrow, so that there is no likelihood that lining material will become wedged in the lapped joint.

For further imparting anti-fouling qualities to the edge 80, this edge is preferably cut at an angle to the axis of the trowel so that the direction of motion thereof with respect to any point in the lining 10 crossed thereby is a retreating one independently of the aforesaid rotary motion of the trowel, so that each of these provisions orient the motion of the edge 80 with respect to the particles of lining being troweled so that such particles are wiped over the edge 80 from the outer to the inner portions of the shell surface forming the lap. Accordingly the angular cut of the edge 80 and the rotary motion derived from the distributor head 16 through the bearing 74, 76 are additive in maintaining the lap 28 clear; they are also cooperative in that the rotary torque helps to prevent counter-rotation of the trowel, such as might be otherwise induced by the screw thread shape of the lap 80 for example, which counter-rotation would reduce the antifouling effect of the angularly cut shape of the edge 80.

As aforesaid, since the frusto-conical shape of the trowel body shell 22 limits the lining bearing part thereof to the trailing edge portion 26, the trowel is able to negotiate bends and nonlinearities in the pipe being lined, without scoring the lining at the regions of such shifts of direction. For enabling the trowel to trail freely behind the pipe lining machine 12 at such times, it is preferred that the connection of the trowel harness to the pipe lining machine be of an articulated nature, and although looseness in the pinned connections at the opposite ends of the harness rods 50 would have this effect to some degree, it is preferred that those pinned connections be just free enough to accommodate the trowel shell shape and size changing motions aforedescribed, and that the major articulation between the trowel harness and the lining machine be provided for by a universal joint at this point. Accordingly, in the illustrated embodiment of the invention, the bracket 70 is of U shape as shown, with the base thereof pivotally connected to its legs as indicated at 82, and the axle part 68 is pivotally connected by a pin 84, having an axis at right angles to the other joint pivot axis 82, in a bore in the bracket base member shaped to accommodate pivotal motions about the pin 84 as indicated at 86.

While the resilient set of the spring sheet material forming the shell 22 will tend to keep the edge portions of the shell material in closely lapped relation at the trailing portion of the joint 28, it is preferred that additional means be provided for assuring this smoothly lapped relationship, even where factors such as the possible accumulation of debris on the outer side of the leading and intermediate portions of the trowel shell, or the passing of a service cock protruding into the pipe being lined, might tend to force the lapped portions of the shell 22 apart in a direction radial of the trowel. For this purpose, a joint guide 88 is provided adjacent the trailing edge 26 of the shell 22, at the inner side of the shell adjacent the inner edge 90 of the lap 28. This guide comprises a strap of spring steel or the like having a base part 92 suitably anchored to the overlapped part of the shell, as by being brazed or spot welded thereto, and a slide forming portion 94, offset with respect to the base 92 to cross the lap edge 90 and extend into sliding contact with the inner face of the shell 22 at the lap 28. Accordingly the guide maintains the two layers of the shell in closely lapped condition while permitting these layers to slide freely with respect to each other as the trowel changes size between the extremes called for in service.

From the foregoing, it is believed that the operation of the troweling apparatus of the invention will be clear. When the trowel is placed in operative position in the pipe line, it will be compressed from the expanded condition shown in Fig. 4 and in phantom line in Fig. 5, to an operating size as shown in Fig. 3 and in full line in Fig. 5, this latter size being determined by the interior surface of the lining 10 to be troweled. The various properties of the trowel described herein, including its antiscoring properties, its lightness, and the freedom of the floating contact of the troweling portion 26 of the shell with the surface of the lining 10 to be smoothed as afforded by the flexibility of the shell material and the lapped articulation thereof, as well as the uniformity of troweling pressure provided at that trailing edge by the circumferentially oriented spring forces, find perhaps their greatest utility in the troweling of linings in small diameter pipes.

A trowel substantially the same as the one shown in Fig. 1 and described in detail hereinabove, has been successfully tested in the troweling of a lining in a twelve inch pipe. It has been found most practicable in the lining of such small diameter pipes to use a highly plastic type of lining material, such as mortar having a slump of seven to eight inches in a standard slump test, which is almost a light grout, producing a lining which is easily damaged by a trowel. It will be understood that the slump referred to is the amount which a frustrum of a pyramid of the mortar four inches square at the top, eight inches square at the bottom and twelve inches high will settle or "slump" after it has been released from the retaining force of a mold. It was found that the shell 22 of the trowel tested, in which the sheet material of the shell was spring steel of about eight thousandths of an inch thickness, conformed very well to the lining surface shape and size while maintaining the desired limitation of troweling contact to the trailing edge of the shell, and that the thrust bearing connection 74, 76 between the trowel body and the high speed (about 1750 r.p.m.) external rotor 72 of the distributor head 16 satisfactorily rotated the trowel at about one-quarter revolution per minute as the trowel advanced as shown in Fig. 2.

While the shell 22 of the trowel thus far described in detail consists of a single segment or piece of sheet material returned upon itself to form a single lapped joint 28, where desired the shell may be composed of any number of segments with laps of the character shown at 28 therebetween, the segment edges forming each lap being joined by a pivot such as shown at 30, stiffened, as by the ring 32, and subjected to circumferentially aligned spring forces, as by spring means at each lap of the kind shown at 36, 42. Thus, in the form shown in Figs. 8 and 9, the trowel 20' has a shell 22' to be coupled by a thrust bearing to a lining machine rotor (not shown) by harness bars 50', and formed with a plurality of segments 100, 102, 106 of thin spring sheet material, such as spring steel, stiffened at its leading portion by a ring 32' carried by brackets 34' on the shell segments, and provided with laps 28' between each of the segments having joint guides 88' and angularly cut exposed edges 80' and being pivoted by rivets 30' for being spread by adjustable circumferential springs 36', 42', all in the same manner as shown and described in greater detail with regard to the similarly numbered parts of the trowel of Figs. 1–7.

So also, although the primary circumferential spring force is shown to be provided by a spring 36 which is physically aligned in the circumferential direction, it will be understood that the desired resilient, preferably circumferential force could be derived from other sources, such as a spring acting around the pivot 30 and operating to urge the lap forming parts of the shell in a shell circumference enlarging direction. Accordingly, while only two forms of the invention have been illustrated and described in detail, it will be understood that the invention may be otherwise embodied within the spirit of the invention and the scope of the appended claims.

What is claimed is:

1. Trowel means for use with a machine adapted to apply a lining of plastic material to a pipe while traveling therethrough, comprising an annular shell of thin resiliently flexible sheet material, said shell being provided with at least one generally longitudinal joint formed by lapped edges of said sheet material and extending to the trailing edge of said shell, stiffening and articulating means at the leading end portion of said shell adapted to impart a cross-sectionally generally circular shape of substantially fixed circumference to said leading end portion, resilient bias means connected to said shell at opposite sides of said joint and disposed to apply force to said shell directed circumferentially thereof at said lapped joint rearwardly of said articulating means to expand the training edge of said shell to a circumference substantially greater than said leading end circumference to impart a generally frusto-conical shape to said shell for bringing the trailing edge of said shell into troweling contact with said linging, and harness means connected to the leading end portion of said shell and comprising articulated means for connecting said shell to said machine to trail therebehind, the edge of the outer layer of said lapped joint being directed at an angle to a genetrix of the conical shell therethrough to have an attitude facing rearwardly of said shell.

2. In combination with a machine adapted to apply a lining of plastic material to a pipe while traveling therethrough, said machine comprising a high speed lining material distributor head rotor at the trailing end thereof, trowel means for smoothing the surface of the lining applied by said machine comprising an annular shell of thin resiliently flexible sheet material, said shell being provided with at least one generally longitudinal joint formed by lapped edges of said sheet material and extending to the trailing edge of said shell, articulating means adapted to impart a substantially fixed circumference to said shell at a position forward of the trailing end thereof, yieldable bias means disposed to apply force to said shell directed to expand said trailing edge to a circumference substantially greater than said fixed circumference to impart a generally frusto-conical operative shape to said shell for bringing the trailing edge of said shell into troweling contact with said lining, and harness means connected to said shell comprising coupling means connecting said shell to said distributor rotor to trail therebehind, said coupling means comprising universal joint and thrust bearing means, said bearing means being adapted to transmit torque from said distributor rotor to said shell for urging said shell into slow rotation incidental to its forward motion, the outer layer of said lapped joint being lapped in the direction opposite to the direction of said rotation.

3. Trowel means for use with a machine adapted to apply a lining of plastic material to a pipe while traveling therethrough, comprising an annular shell of thin resiliently flexible sheet material, said shell being provided with at least one generally longitudinal joint formed by lapped edges of said sheet material and extending to the trailing edge of said shell, stiffening and articulating means at the leading end portion of said shell adapted to impart a cross-sectionally generally circular shape of substantially fixed circumference to said leading end portion, resilient bias means connected to said shell at opposite sides of said joint and disposed to apply force to said shell directed circumferentially thereof at said lapped joint rearwardly of said articulating means to expand the trailing edge of said shell to a circumerence substantially greater than said leading end circumference to impart a generally frusto-conical shape to said shell for bringing the trailing edge of said shell into troweling contact with said lining, guide means adapted to maintain the trailing edge portions of said joint in closely lapped relation, and harness means connected to the leading end portion of said shell and comprising articulated means for connecting said shell to said machine to trail therebehind.

4. Conical trowel means for use with a machine adapted to apply a lining of plastic material to a pipe centrifugally while traveling therethrough, comprising an annular shell of thin resiliently flexible hard surfaced sheet material, said shell being provided with at least one generally longitudinal joint formed by lapped edges of said sheet material extending to the trailing edge of said shell, support means connected with said shell at spaced points in a transverse plane adjacent to the leading end of said shell for relative movement whereby the connected points constrain said shell to a relatively fixed diameter at said plane while permitting free angular movement of the shell wall about such connected points for varying the vertex angle of said shell, and spring means auxiliary to the shell and operatively connected thereto for urging said trailing edge into troweling contact with said lining, said spring means comprising an expansion element connected to said shell at opposite sides of said joint at points on an annular line about said shell spaced rearwardly from said position, to exert force on said shell directed circumferentially thereto and therefore having radial components self-equalizing in value and effective substantially continuously along said line, said trailing edge being non-rigidized and freely flexible to follow yieldingly the surface of said lining.

5. Trowel means for smoothing a layer of mortar in an interior cylindrical surface, said trowel means comprising a conical shell of thin resiliently flexible hard surfaced sheet material bent to generally conical form with the small end thereof comprising a leading end portion and the base end thereof comprising a trailing end troweling portion, support means connected with said shell at spaced points in a transverse plane adjacent to the leading end of said shell for relative movement whereby the connected points constrain said shell to a relatively fixed diameter at said plane while permitting free angular movement of the shell wall about such connected points for varying the vertex angle of said shell, said conical shell being severed along a longitudinal line for permitting diametral expansion and contraction of the base of said conical shell, and resilient expansion means confined within the shell adjacent to the trailing end portion thereof and operatively disposed to act against the interior of said shell and across said line of severance to exert a yieldable perimeter-increasing force on said shell at the trailing end thereof, said trailing end being freely flexible to exert a relatively light trailing-plate troweling pressure against said layer of mortar and to deform freely laterally from a normal circular form to conform to noncircularity in said interior surface and to pass obstructions therein, the perimeter-increasing force of said resilient expansion means being self-equalizing in radial directions whereby non-circular conformity of said trailing end is not substantially resisted thereby.

6. Trowel means for smoothing a layer of mortar in an interior cylindrical surface, said trowel means comprising a conical shell of thin resiliently flexible hard surfaced sheet material bent to generally conical form with the small end thereof comprising a leading end portion and the base end thereof comprising a trailing end troweling portion, support means connected with said shell at spaced points in a transverse plane adjacent to the leading end of said shell for relative movement whereby the connected points constrain said shell to a relatively fixed diameter at said plane while permitting free angular movement of the shell wall about such connected points for varying the vertex angle of said shell, said conical shell having at least one generally longitudinal joint formed by lapped edges of said sheet material for permitting diametral expansion and contraction of the base of said conical shell, and resilient expansion means confined within the shell adjacent to the trailing end portion thereof and operatively disposed to act against the interior of said shell and across said lapped edges to exert a yieldable perimeter-increasing force on said shell at the trailing end thereof, said trailing end being freely flexible to exert a relatively light trailing-plate troweling pressure against said layer of mortar and to deform freely laterally from a normal circular form to conform to noncircularity in said interior surface and to pass obstructions therein, the perimeter-increasing force of said resilient expansion means being self-equalizing in radial directions whereby non-circular conformity of said trailing end is not substantially resisted thereby.

7. Trowel means for smoothing a layer of mortar in an interior cylindrical surface, said trowel means comprising a conical shell of thin resiliently flexible hard surfaced sheet material bent to generally conical form with the small end thereof comprising a leading end portion and the base end thereof comprising a trailing end troweling portion, support means connected with said shell at spaced points in a transverse plane adjacent to the leading end of said shell for relative movement whereby the connected points constrain said shell to a relatively fixed diameter at said plane while permitting free angular movement of the shell wall about such connected points for varying the vertex angle of said shell, said conical shell being severed along a longitudinal line for permitting diametral expansion and contraction of the base of said conical shell, and resilient expansion means confined within the shell adjacent to the trailing end portion thereof and operatively disposed to act against the interior of said shell and across said line of severance to exert a yieldable perimeter-increasing force on said shell at the trailing end thereof, said trailing end being freely flexible to exert a relatively light trailing-plate troweling pressure against said layer of mortar and to deform freely laterally from a normal circular form to conform to noncircularity in said interior surface and to pass obstructions therein, the perimeter-increasing force of said resilient expansion means being self-equalizing in radial directions whereby noncircular conformity of said trailing end is not substantially resisted thereby, and means for adjusting the resilient bias means for varying the degree of perimeter-increasing force impacted thereby.

8. Trowel means for smoothing a layer of mortar in an interior cylindrical surface, said trowel means comprising a conical shell of thin resiliently flexible hard surfaced sheet material bent to generally conical form with the small end thereof comprising a leading end portion and the base end thereof comprising a trailing end troweling portion, support means connected with said shell at spaced points in a transverse plane adjacent to the leading end of said shell for relative movement whereby the connected points constrain said shell to a relatively fixed diameter at said plane while permitting free angular movement of the shell wall about such connected points for varying the vertex angle of said shell, said conical shell being severed along a longitudinal line for permitting diametral expansion and contraction of the base of said conical shell, and resilient expansion means confined within the shell adjacent to the trailing end portion thereof and operatively disposed to act against the interior of said shell and across said line of severance to exert a yieldable perimeter-increasing force on said shell at the trailing end thereof, said trailing end being freely flexible to exert a relatively light trailing-plate troweling pressure against said layer of mortar and to deform freely laterally from a normal circular form to conform to non-circularity in said interior surface and to pass obstructions therein, the perimeter-increasing force of said resilient expansion means being self-equalizing in radial directions whereby non-circular conformity of said trailing end is not substantially resisted thereby, and means operable by and upon forward movement of said trowel means for producing relatively slow rotation thereof for freeing the same from debris.

9. Trowel means for smoothing a layer of mortar in an interior cylindrical surface, said trowel means comprising a conical shell of thin resiliently flexible hard surfaced sheet material bent to generally conical form with the small end thereof comprising a leading end portion and the base end thereof comprising a trailing end troweling portion, means connected with said shell adjacent to the leading end of said shell for relative movement whereby the connected means constrain said shell to a relatively fixed diameter at said plane while permitting free angular movement of the shell wall about such connected points for varying the vertex angle of said shell, said conical shell being severed along a longitudinal line for permitting diametral expansion and contraction of the base of said conical shell, and resilient expansion means confined within the shell adjacent to the trailing end portion thereof and operatively disposed to act against the interior of said shell and across said line of severance to exert a yieldable perimeter-increasing force on said shell at the trailing end thereof, said trailing end being freely flexible to exert a relatively light trailing-plate troweling pressure against said layer of mortar and to deform freely laterally from a normal circular form to conform to noncircularity in said interior surface and to pass obstructions therein, the perimeter-increasing force of said resilient expansion means being self-equalizing in radial directions whereby non-circular conformity of said trailing end is not substantially resisted thereby.

10. Trowel means for smoothing a layer of mortar in an interior cylindrical surface, said trowel means comprising a conical shell of thin resiliently flexible hard surfaced sheet material bent to generally conical form with the small end thereof comprising a leading end portion and the base end thereof comprising a trailing end troweling portion, said conical shell being severed along a longitudinal joint formed by lapped edges of said sheet material for permitting diametral expansion and contraction of the base of said conical shell, means movably connecting the overlapping portions of said shell at the leading end portion to constrain the leading end to a relatively fixed circumference while permitting free angular movement of the shell wall about said leading end portion for varying the vertex angle of said shell, and resilient expansion means confined within the shell adjacent to the trailing end portion thereof and operatively disposed to act against the interior of said shell and across said lapped edges to exert a yieldable perimeter-increasing force on said shell at the trailing end thereof, said trailing end being freely flexible to exert a relatively light trailing-plate troweling pressure against said layer of mortar and to deform freely laterally from a normal circular form to conform to non-circularity in said interior surface and to pass obstructions therein, the perimeter-increasing force of said resilient expansion means being self-equalizing in radial directions whereby non-circular conformity of said trailing end is not substantially resisted thereby.

References Cited in the file of this patent

UNITED STATES PATENTS

| | | |
|---|---|---|
| 452,938 | Gillmore | May 26, 1891 |
| 464,756 | Jeeves | Dec. 8, 1891 |
| 896,520 | Deuchar | Aug. 18, 1908 |
| 1,180,230 | Bowman | Apr. 18, 1916 |
| 2,261,928 | Perkins | Nov. 4, 1941 |
| 2,517,780 | Frank | Aug. 8, 1950 |
| 2,575,353 | MacEvoy | Nov. 20, 1951 |
| 2,602,177 | Aho | July 8, 1952 |
| 2,758,352 | Perkins | Aug. 14, 1956 |

FOREIGN PATENTS

| | | |
|---|---|---|
| 112,653 | Australia | Feb. 28, 1941 |

UNITED STATES PATENT OFFICE
CERTIFICATE OF CORRECTION

Patent No. 2,924,867                    February 16, 1960

Warren E. Perkins

It is hereby certified that error appears in the printed specification of the above numbered patent requiring correction and that the said Letters Patent should read as corrected below.

Column 4, line 38, for "trawel" read -- trowel --; column 8, line 20, for "training" read -- trailing --; line 24, for "linging" read -- lining --; column 9, line 28, for "thereto" read -- thereof --.

Signed and sealed this 26th day of July 1960.

(SEAL)
Attest:

KARL H. AXLINE
Attesting Officer

ROBERT C. WATSON
Commissioner of Patents